US008825220B2

(12) United States Patent
Nito et al.

(10) Patent No.: US 8,825,220 B2
(45) Date of Patent: Sep. 2, 2014

(54) SYSTEM FOR CONTROLLING AN IN-VEHICLE DEVICE

(75) Inventors: Yoshiharu Nito, Kanagawa-ken (JP); Tsuneo Suzuki, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 208 days.

(21) Appl. No.: 13/220,877

(22) Filed: Aug. 30, 2011

(65) Prior Publication Data

US 2012/0101656 A1    Apr. 26, 2012

(30) Foreign Application Priority Data

Oct. 21, 2010    (JP) .................................. 2010-236178

(51) Int. Cl.
*G06F 7/00*    (2006.01)
*G06F 17/00*    (2006.01)

(52) U.S. Cl.
USPC ............................................................ 701/1

(58) Field of Classification Search
USPC ............................................................ 701/1
See application file for complete search history.

(56) References Cited

U.S. PATENT DOCUMENTS

| 2006/0020372 | A1* | 1/2006 | Watabe | 701/1 |
| 2006/0195233 | A1* | 8/2006 | Ogawa et al. | 701/2 |
| 2006/0212194 | A1* | 9/2006 | Breed | 701/29 |
| 2006/0217849 | A1* | 9/2006 | Obradovich et al. | 701/1 |
| 2006/0235575 | A1* | 10/2006 | Brown et al. | 701/1 |
| 2007/0032913 | A1* | 2/2007 | Ghoneim et al. | 701/1 |
| 2007/0124043 | A1* | 5/2007 | Ayoub et al. | 701/36 |
| 2007/0124044 | A1* | 5/2007 | Ayoub et al. | 701/36 |
| 2007/0124046 | A1* | 5/2007 | Ayoub et al. | 701/36 |

FOREIGN PATENT DOCUMENTS

| JP | 2008-097403 A | 4/2008 |
| JP | 2009-97272 | 5/2009 |

OTHER PUBLICATIONS

Japanese Office Action issued on Feb. 26, 2014 in corresponding Japanese Application No. 2010-236178, along with English translation.

* cited by examiner

*Primary Examiner* — Mary Cheung
*Assistant Examiner* — Frederick Brushaber
(74) *Attorney, Agent, or Firm* — White & Case LLP

(57) ABSTRACT

According to one embodiment, a system for controlling an in-vehicle device is provided. The system has an in-vehicle device and an electronic control unit. The electronic control unit generates control signals to control the in-vehicle device and transmits the generated control signals to the in-vehicle device. The in-vehicle device has a semiconductor integrated circuit and a semiconductor memory circuit. The semiconductor integrated circuit is capable of performing a plurality of functional operations. The semiconductor memory circuit stores pieces of setting information necessary to perform the respective functional operations. The electronic control unit has a designation signal generation unit to output designation signals as the control signals. Each of the designation signals designates one of the pieces of setting information to be read from the semiconductor memory circuit. The semiconductor integrated circuit receives the designated one of the pieces of setting information which is read from the semiconductor memory circuit.

8 Claims, 5 Drawing Sheets

SYSTEM FOR CONTROLLING AN IN-VEHICLE DEVICE

This application is based upon and claims the benefit of priority from the prior Japanese Patent Application No. 2010-236178, filed on Oct. 21, 2010, the entire contents of which are incorporated herein by reference.

FIELD

Embodiments described herein relate generally to a system for controlling an in-vehicle device.

BACKGROUND

Various electronic control units (ECUs) have been installed in vehicles with progress of introducing electronic techniques into the vehicles. An electronic control unit is provided to control a corresponding in-vehicle device. An in-vehicle device for receiving radio signal composes a keyless entry system or a tire pressure monitoring system, for example. The in-vehicle device for receiving radio signal is known as an in-vehicle device which is controlled by such an electronic control unit.

The in-vehicle device for receiving radio signal receives and demodulates a radio signal transmitted from a transmitter, and transmits the demodulated signal to an electronic control unit in order to control the in-vehicle device. For the purpose of performing such processing, an IC for receiving radio signal is installed in the in-vehicle device.

The electronic control unit and the in-vehicle device for receiving radio signal are connected via a wire harness. Control signals outputted from the electronic control unit are transmitted to the IC for receiving radio signal via the wire harness. Cables of the wire harness are assigned to the control signals respectively. Significances of the control signals are transmitted as DC voltage values via the respective cables, which enables static signal transmission of the significances.

In recent years, such an IC for receiving radio signal has progressed to have multi-functions so that the number of control signals tends to increase. The increase of the number of the control signals causes a problem that the number of cables of the wire harness increases according to a conventional static signal transmission.

In order to suppress increase of the number of the cables of the wire harness, a serial data transmission method may be employed. In the serial data transmission method, a plurality of control signals are converted into serial data and transmitted. However, the inside of a vehicle is an environment with a large amount of noise generally so that the employment of the serial data transmission may cause bit error of data due to the noise.

In order to suppress increase of the number of cables, another method may be employed. The method is that part of functions of an electronic control unit is integrated into a sub-microcomputer and that the sub-microcomputer is installed in an in-vehicle device for receiving radio signal. The sub-microcomputer controls an IC for receiving radio signal in the in-vehicle device.

In this method, the functions of the electronic control unit are divided so that it is possible to reduce the number of control signals to be outputted from the electronic control unit. However, such a sub-microcomputer can be a complicated circuit and the complicated circuit is installed in an in-vehicle device for receiving radio signal, which causes a problem of increase of failure rate of the in-vehicle device.

DETAILED DESCRIPTION

Figure 1:
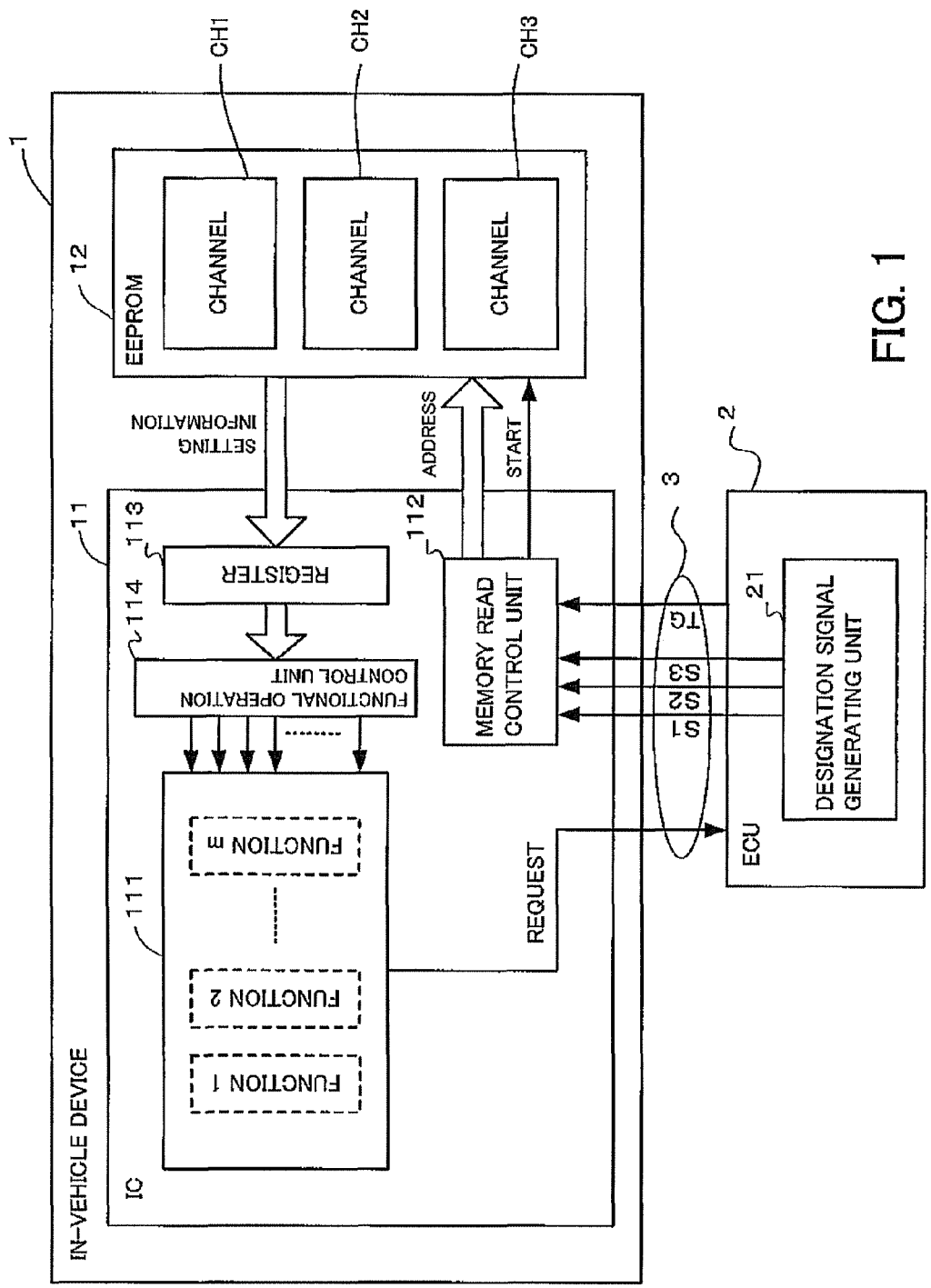
FIG. 1 is a block diagram showing a configuration of an in-vehicle device control system according to a first embodiment.

According to one embodiment, a system for controlling an in-vehicle device is provided. The system has an in-vehicle device and an electronic control unit. The electronic control unit generates control signals to control the in-vehicle device and transmits the generated control signals to the in-vehicle device via a wire harness. The in-vehicle device is provided with a semiconductor integrated circuit and a semiconductor memory circuit. The semiconductor integrated circuit is capable of performing a plurality of functional operations. The semiconductor memory circuit stores pieces of setting information which are necessary to perform the respective functional operations.

The electronic control unit is provided with a designation signal generation unit to output designation signals as the control signals. Each of the designation signals designates one of the pieces of setting information to be read from the semiconductor memory circuit. The semiconductor integrated circuit receives the designated one of the pieces of setting information which is read from the semiconductor memory circuit according to each of the outputted designation signals.

Hereinafter, further embodiments will be described with reference to the drawings.

In the drawings, the same reference numerals denote the same or similar portions respectively.

A first embodiment will be described with reference to FIG. 1.

FIG. 1 is a block diagram showing a configuration of an in-vehicle device control system according to a first embodiment. The first embodiment is an example applied to an in-vehicle device for receiving radio signal.

As shown in FIG. 1, the system according to the embodiment is provided with an in-vehicle device 1 and an electronic control unit 2 to control the in-vehicle device 1. The in-vehicle device 1 and the electronic control unit 2 transmit electrical signals to each other via a wire harness 3. Further, the in-vehicle device 1 and the electronic control unit 2 receive electrical signals from each other via a wire harness 3.

For example, the in-vehicle device 1 has an integrated circuit (RF-IC) 11 for receiving a radio signal and an EEPROM 12 as a non-volatile memory circuit. The radio signal is transmitted from a transmitter which composes a keyless entry system. The non-volatile memory circuit is not limited to EEPROM, but other types of non-volatile memory circuit may be used.

The integrated circuit 11 demodulates a received radio signal and transmits demodulated data to the electronic control unit 2. The integrated circuit 11 has a function operating unit 111 to perform a plurality of functional operations such as switching a reception frequency range, switching band limitation of receiving data, an autonomous ON/OFF control function and a signal detection function, in addition to the above primary function.

Setting information which is necessary to perform each functional operation of the integrated circuit 11 is stored in the EEPROM 12 in advance. Pieces of the setting information may be respectively set as channels. For example, three channels CH1 to CH3 are set in the embodiment shown in FIG. 1. The pieces of setting information are stored in the EEPROM 12 in a channel unit.

Such storing of the pieces of setting information may enable selecting optimal setting information according to a corresponding application or a reception frequency. For example, one of the pieces of setting information may be stored in the channel CH1 for a keyless entry system, and another one of the piece of setting information may be stored in the channel CH2 for a tire pressure monitoring system. Reading of optimal setting information for each system is controlled via the wire harness 3, according to the above storing.

The electronic control unit 2 has a designation signal generation unit 21 to select the pieces of setting information. The designation signal generation unit 21 generates three designation signals S1 to S3 respectively to designate the channels of the EEPROM 12 which stores the pieces of setting information necessary to execute the functions in the integrated circuit 11. The designation signals S1 to S3 are generated to execute the functions selectively according to a user's option of making the integrated circuit 11 to perform or a request signal REQUEST from the integrated circuit 11.

The designation signals S1 to S3 are static signals. When the designation signal S1 is high level, the channel CH1 is selected. Similarly, the channel CH2 is selected by the designation signal S2, and the channel CH3 is selected by the designation signal S3.

Further, the electronic control unit 2 generates a trigger signal TG to execute start of reading from the EEPROM 12.

The designation signals S1 to S3 and the trigger signal TG are transmitted to the integrated circuit 11 via the wire harness 3.

The integrated circuit 11 is provided with a memory read control unit 112, a register 113, and a functional operation control unit 114. The memory read control unit 112 receives the designation signals S1 to S3 and the trigger signal TG transmitted from the electronic control unit 2, and controls reading of the pieces of setting information from the EEPROM 12. The register 113 stores at least one of the setting information read from the EEPROM 12. The functional operation control unit 114 outputs control signals to control the functional operation unit 111 based on the at least one of the pieces of setting information stored in the register 113.

When the trigger signal TG is transmitted from the electronic control unit 2, the memory read control unit 112 outputs a read start signal START to the EEPROM 12.

Further, the memory read control unit 112 outputs an address signal ADDRESS to the EEPROM 12, in order to access an address of the EEPROM 12 which stores one of the pieces of setting information of a designated channel based on the designation signals S1 to S3 received from the electronic control unit 2.

The functional operation control unit 114 outputs control signals to control functional operations of the functional operation unit 111 based on the setting information stored in the register 113. The number of the control signals outputted from the functional operation control unit 114 is up to about 100 when the functional operation unit 111 can have many functions.

In the embodiment, three designation signals are transmitted from the electronic control unit 2 to the integrated circuit 11 in order to select functional operation of the integrated circuit 11. Such transmission of the three designation signals enable reducing the number of cables which are bundled in the wire harness.

Further, the noise immunity can be enhanced because the designation signals are transmitted as static signals.

According to the embodiment, a sub-microcomputer having a complicated circuit does not need to be installed in the in-vehicle device 1 so that the failure rate of the in-vehicle device 1 is suppressed to increase.

In the first embodiment described above, a one-to-one relationship exists between the number of the channels of the setting information stored in the EEPROM 12 and the number of the designation signals transmitted from the electronic control unit 2. Accordingly, as the number of the channels in the EEPROM 12 increases, the number of the designation signals transmitted from the electronic control unit 2 increases and the number of the cables in the wire harness increases. In the following embodiment, an in-vehicle device control system is provided in which increase of the number of the cables in the wire harness is suppressed even when many channels are formed in the EEPROM 12.

Figure 2:
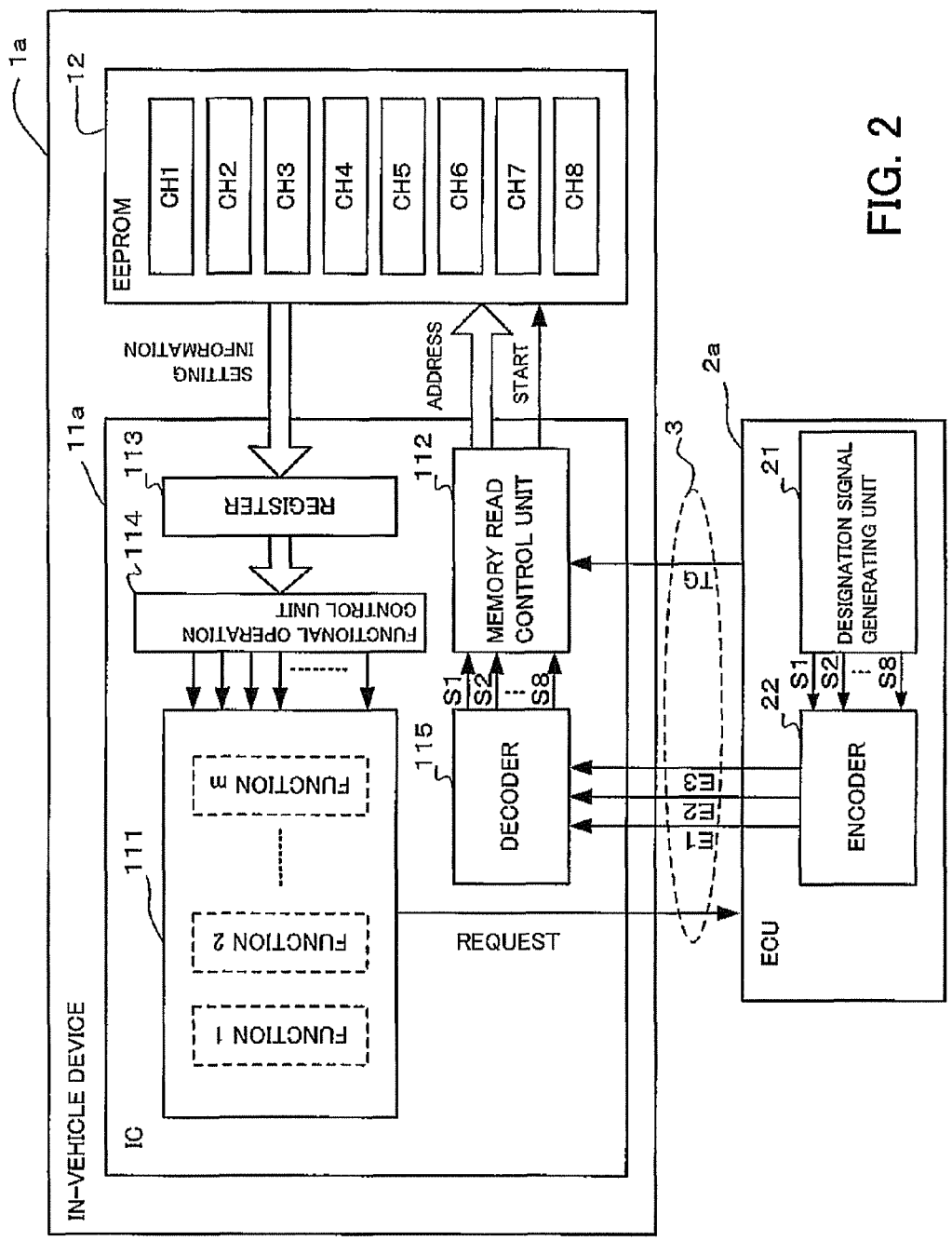
FIG. 2 is a block diagram showing a configuration of an in-vehicle device control system according to a second embodiment.

FIG. 2 is a block diagram showing a configuration of an in-vehicle device control system according to a second embodiment of the invention. FIG. 2 shows a case where the number of the channels of the setting information stored in the EEPROM 12 is eight (8) that corresponds to channels CH1 to CH8. The number of the channels is not limited to eight.

In an electronic control unit 2a of the embodiment, a designation signal generation unit 21 generates eight designation signals S1 to S8 corresponding to the number of channels in the EEPROM 12. Accordingly, the electronic control unit 2a of the embodiment is provided with an encoder 22 to encode information of the designation signals S1 to S8 outputted from the designation signal generation unit 21 into binary.

The encoder 22 outputs three encoded designation signals E1 to E3. At this time, the encoded designation signals E1 to E3 are outputted as static signals.

In the embodiment, the three encoded designation signals E1 to E3 outputted from the encoder 22 are transmitted to an integrated circuit 11a of an in-vehicle device 1a via a harness 3.

The integrated circuit 11a includes a decoder 115 to decode the information of the encoded designation signals E1 to E3 transmitted from the electronic control unit 2a.

The decoder 115 decodes the information of the received encoded designation signals E1 to E3 and outputs the designation signals S1 to S8 to a memory read control unit 112.

The memory read control unit 112 outputs an address signal ADDRESS of a designated channel to the EEPROM 12 based on the inputted designation signals S1 to S8. The setting information of the channel designated by the electronic control unit 2a is read from the EEPROM 12 by the output of the address signal ADDRESS. The operation after reading the setting information of the channel is similar to that of the first embodiment.

Figure 3:
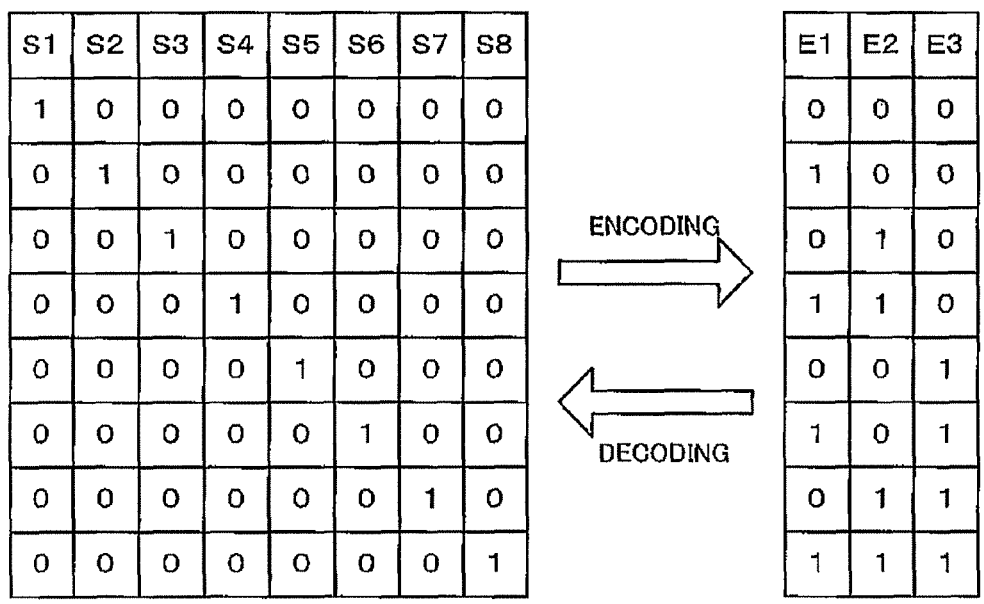
FIG. 3 is a diagram showing a correspondence relationship between designation signals and encoded designation signals.

FIG. 3 shows an example of a correspondence relationship between the designation signals S1 to S8 and the encoded designation signals E1 to E3.

For example, when the designation signal S1 indicates "1" and the designation signals S2 to S8 indicate "0", the encoded designation signals E1 to E3 are encoded as E1=0, E2=0, and E3=0. When the designation signal S2 indicates "1" and the designation signals S1 and S3 to S8 indicate "0", the encoded designation signals E1 to E3 are encoded as E1=1, E2=0, and E3=0. When decoding of the encoded signals is performed, a conversion processing which is reverse to the encoding is executed.

According to the embodiment, even if the number of the channels of the setting information stored in the EEPROM 12 is large, the number of control signals transmitted from the electronic control unit 2a to the in-vehicle device 1a can be reduced because the designation signals are encoded in the electronic control unit 2a. As a result, increase of the number of cables in the wire harness 3 can be suppressed.

Usually, reliability is important for a vehicle. Accordingly, reliability of in-vehicle devices needs to be improved. In an in-vehicle device control system of the following embodiment, plural sets of n-multiplexed information pieces (information pieces multiplexed by "n") are stored in an EEPROM. The plural sets of n-multiplexed information pieces are obtained by multiplexing respective pieces of setting information. "n" is an odd number equal to or greater than three. This configuration of the system increases reliability in storing and reading the pieces of setting information.

Figure 4:
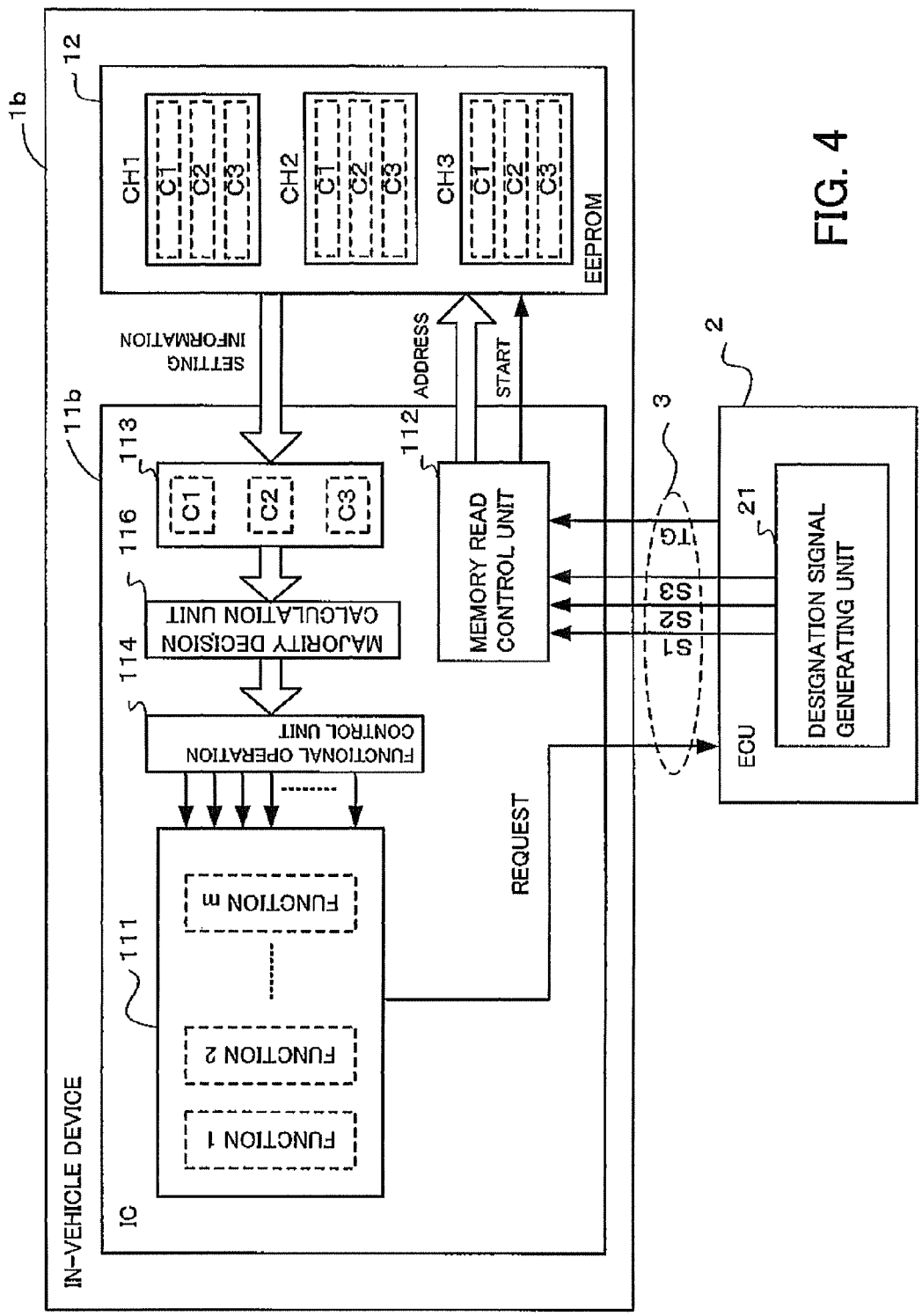
FIG. 4 is a block diagram showing a configuration of an in-vehicle device control system according to a third embodiment.

FIG. 4 is a block diagram showing a configuration of an in-vehicle device control system according to a third embodiment.

A basic configuration of the embodiment is same as that of the first embodiment. However, in an in-vehicle device 1b of the third embodiment, each piece of setting information to be stored in the EEPROM 12 is tripled or three-multiplexed for each channel and then stored. Specifically, pieces of setting information C1, C2 and C3 (C1=C2=C3) which are obtained by tripling a piece of setting information of each of the channels CH1 to CH3 are stored in each of the channels CH1 to CH3 in the EEPROM 12.

In the embodiment, for example, when the channel CH1 of the EEPROM 12 is read, the tripled pieces of setting information C1 to C3 of the read channel CH1 are stored in a register 113 of an integrated circuit 11b for receiving radio signal, in the in-vehicle device 1b.

The tripled pieces of setting information C1 to C3 stored in the register 113 should have the same value respectively. However, when some trouble occurs during storing information into the EEPROM 12 or reading information from the EEPROM 12, the tripled pieces of setting information C1 to C3 stored in the register 113 are not necessarily the same value. Usually, the occurrence probability of the trouble described above is small. The rate of data changed from the original data i.e. the piece of setting information is considered to be small.

Accordingly, the integrated circuit 11b of the embodiment is provided with a majority determination calculating unit 116 and performs a majority determination operation based on the pieces of setting information C1 to C3 stored in the register 113.

The majority determination calculating unit 116 compares the data values of the pieces of setting information C1 to C3 with one another. The majority determination calculating unit 116 deems the majority of the data values as correct data value and outputs the data of the majority.

A functional operation control unit 114 of the embodiment outputs control signals to control the functional operation unit 111 based on the setting information outputted from the majority determination calculating unit 116.

According to the third embodiment as described above, the plural sets of n-multiplexed information pieces are stored in the EEPROM 12. The plural sets of n-multiplexed information pieces are obtained by multiplexing the respective pieces of setting information. Thus, it is possible to increases reliability in storing the pieces of setting information in the EEPROM 12 and in reading the pieces of setting information from the EEPROM 12. Further, the reliability of the in-vehicle device 1b in which the EEPROM 12 is provided can be increased.

In the embodiments described above, the trigger signal TG for initiating reading the EEPROM 12 is transmitted from the electronic control unit 2 or 2a to a memory read control unit 112. Accordingly, a cable for transmitting the trigger signal TG is needed in a wire harness 3. The following embodiment provides an in-vehicle device control system in which the trigger signal TG does not need to be transmitted from the electronic control unit.

Figure 5:
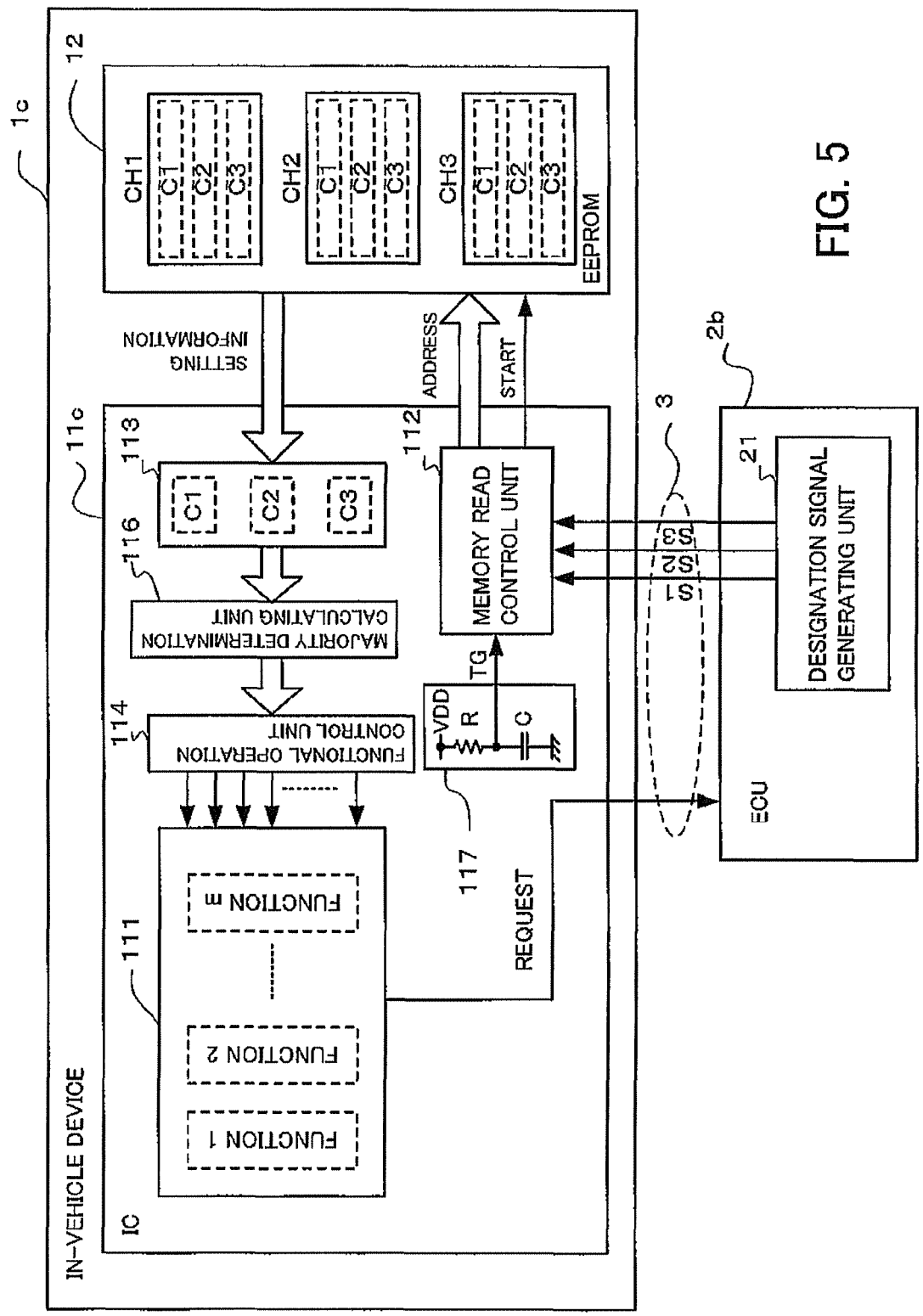
FIG. 5 is a block diagram showing a configuration of an in-vehicle device control system according to a fourth embodiment.

FIG. 5 is a block diagram showing a configuration of an in-vehicle device control system according to a fourth embodiment of the present invention.

A basic configuration of the fourth embodiment is same as that of the third embodiment. However, the fourth embodiment is different from the third embodiment in a point that a trigger signal generation circuit 117 is provided in an integrated circuit 11c for receiving radio signal which is installed in the in-vehicle device.

The trigger signal generation circuit 117 is a circuit to detect a rising edge of a power source voltage VDD applied to the integrated circuit 11C. The trigger signal generation circuit 117 generates the trigger signal TG instead of an electronic control unit 2b, and outputs the trigger signal TG to a memory read control unit 112. As a detailed circuit of the trigger signal generation circuit 117, an integrating circuit including a series circuit of a resistance R and a capacitor C shown in FIG. 5 may be used.

When electric power is applied to the integrated circuit 11C, the trigger signal generation circuit 117 detects a rising edge of the power source voltage VDD and outputs the trigger signal TG. After the power source voltage VDD rises, the memory read control unit 112 outputs a read start signal START and an address signal ADDRESS to the EEPROM 12 automatically, and reading of the EEPROM 12 is performed.

According to the fourth embodiment, it is not necessary to transmit the trigger signal TG from an electronic control unit 2 to the memory read control unit 112 so that the number of cables in a wire harness 3 can be reduced. The trigger signal generation circuit 117 may be included in the integrated circuit 11 or 11a of the first and the second embodiments.

According to the in-vehicle device control systems of the above described embodiments, an electronic control unit can directly control a multifunction integrated circuit installed in an in-vehicle device by using static control signals. Accordingly, the number of cables in a wire harness can be reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A system for controlling an in-vehicle device, comprising an in-vehicle device and an electronic control unit, the electronic control unit generating control signals to control the in-vehicle device and transmitting the generated control signals to the in-vehicle device via a wire harness, the in-vehicle device is provided with a semiconductor integrated circuit and a semiconductor memory circuit, wherein the semiconductor integrated circuit includes a functional operation control unit, a memory read control unit and a majority determination calculating unit, the functional operation control unit being provided for outputting control signals to control functional operations, the semiconductor memory circuit includes channels and storing plural sets of n-multiplexed information pieces of setting information which are necessary to perform the respective functional operations in the channels in a channel unit, where "n" is an odd number equal to or greater than three, the electronic control unit is provided with a designation signal generation unit connected to the memory read control unit via the wire harness, the designation signal generation unit outputting static designation signals as the control signals to the memory read control unit so as to generate address signals, the n-multiplexed pieces of setting information being read from the channels of the semiconductor memory circuit according to designation by the address signals and being output to the functional operation control unit, and the majority determination calculating unit receives the read n-multiplexed information pieces of setting information and determines information pieces to be output to the functional operation control unit of the semiconductor integrated circuit by majority determination logic, the majority determination calculating unit comparing the data values of the n-multiplexed information pieces with each other and deeming the majority of the data values as correct data values to output the data of the majority to the functional operation control unit so as to select the functional operations.

2. The system according to claim 1, wherein the semiconductor integrated circuit is provided with a circuit to generate a trigger signal to start reading one of the pieces of setting information from the semiconductor memory circuit, the trigger signal being generated when power is applied to the semiconductor integrated circuit, which results in that the semiconductor integrated circuit outputs a read start signal and the address signals to the semiconductor memory circuit automatically.

3. The system according to claim 1, wherein the electronic control unit is provided with an encoder to encode and transmit the designation signals, and the semiconductor integrated circuit includes a decoder which decodes the received encoded designation signals to designate the pieces of setting information stored in the semiconductor memory circuit respectively.

4. A system for controlling an in-vehicle device, comprising an in-vehicle device and an electronic control unit, the electronic control unit generating control signals to control the in-vehicle device and transmitting the generated control signals to the in-vehicle device via a wire harness, the in-vehicle device is provided with a semiconductor integrated circuit and a semiconductor memory circuit, wherein the semiconductor integrated circuit includes a functional operation control unit which is provided for outputting control signals to control functional operations, the semiconductor memory circuit includes channels and storing pieces of setting information which are necessary to perform the respective functional operations in the channels in a channel unit, the electronic control unit is provided with a designation signal generation unit connected to the semiconductor integrated circuit via the wire harness, the designation signal generation unit outputting static designation signals as the control signals to generate address signals, the pieces of setting information being read from the channels of the semiconductor memory circuit according to designation by the address signals and being output to the functional operation control unit, and the semiconductor integrated circuit is provided with a circuit to generate a trigger signal to start reading one of the pieces of setting information from the semiconductor memory circuit, the trigger signal being generated when power is applied to the semiconductor integrated circuit, which results in that the semiconductor integrated circuit outputs a read start signal to the semiconductor memory circuit automatically.

5. The system according to claim 4, wherein the electronic control unit is provided with an encoder to encode and transmit the designation signals, and the semiconductor integrated circuit includes a decoder which decodes the received encoded designation signals to designate the pieces of setting information stored in the semiconductor memory circuit respectively.

6. The system according to claim 4, wherein the semiconductor integrated circuit includes a memory read control unit, the designation signals from the designation signal generation unit is provided to the memory read control unit via the wire harness, and output the address signals to the semiconductor memory circuit to read the pieces of setting information from the channels of the semiconductor memory circuit.

7. A system for controlling an in-vehicle device, comprising an in-vehicle device and an electronic control unit, the electronic control unit generating control signals to control the in-vehicle device and transmitting the generated control signals to the in-vehicle device via a wire harness, the in-vehicle device is provided with a semiconductor integrated circuit and a semiconductor memory circuit, wherein the semiconductor integrated circuit includes a functional operation control unit which is provided for outputting control signals to control functional operations, the semiconductor memory circuit includes channels and storing pieces of setting information which are necessary to perform the respective functional operations in the channels in a channel unit, the electronic control unit is provided with a designation signal generation unit connected to the semiconductor integrated circuit via the wire harness, the designation signal generation unit outputting static designation signals as the control signals so as to generate address signals, the pieces of setting information being read from the channels of the semiconductor memory circuit according to designation by the address signals and being output to the functional operation control unit, and the semiconductor integrated circuit is provided with a memory read control unit, the memory read control unit receiving the designation signals and the trigger signal from the electronic control unit and outputting a read start signal and the address signals to the semiconductor memory circuit.

8. The system according to claim 7, wherein the electronic control unit is provided with an encoder to encode and transmit the designation signals, and the semiconductor integrated circuit includes a decoder which decodes the received encoded designation signals to designate the pieces of setting information stored in the semiconductor memory circuit respectively.

\* \* \* \* \*